United States Patent [19]
Hall

[11] 3,825,966
[45] July 30, 1974

[54] VENTURI WINDSHIELD WIPER BLADE
[76] Inventor: Everett J. Hall, 13962 Ordner Dr., Strongsville, Ohio 44136
[22] Filed: Oct. 26, 1972
[21] Appl. No.: 300,985

[52] U.S. Cl. .......................... 15/250.04, 15/250.36
[51] Int. Cl. .............................................. B60s 1/46
[58] Field of Search....... 15/250.36, 250.42, 250.41, 15/250.04

[56] References Cited
UNITED STATES PATENTS
3,089,174  5/1963  Bignon ............................ 15/250.36
3,716,886  2/1973  Klomp ............................. 15/250.04
FOREIGN PATENTS OR APPLICATIONS
996,133  8/1951  France .............................. 15/250.04
1,271,508  8/1961  France .............................. 15/250.41

Primary Examiner—Peter Feldman

[57] ABSTRACT

An improved blade for a windshield wiper, and which is designed to incorporate a venturi effect so to create a suction force inside the blade, thus providing a uniform contact on the windshield throughout the blade length; the device consisting of two wedge-shaped rubber blades enjoined to provide a central hollow space between the blades, the hollow space being closed at opposite ends by a bottom insert and a top insert, the bottom insert including a tubular nipple for connection to a flexible hose from a washer fluid tank.

1 Claim, 17 Drawing Figures

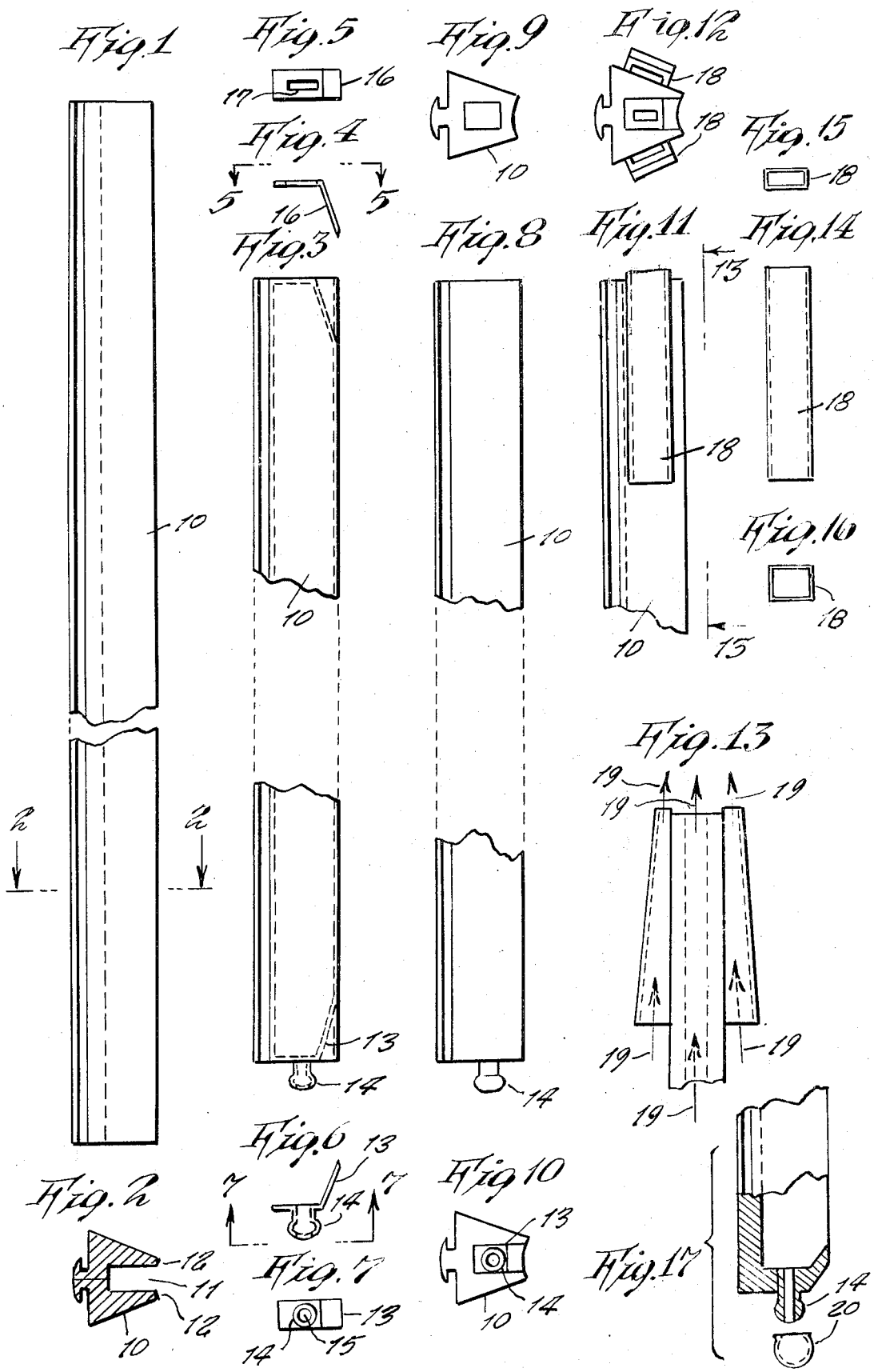

VENTURI WINDSHIELD WIPER BLADE

This invention relates generally to vehicle windshield wipers. More specifically it relates to windshield wiper blades.

A principal object of the present invention is to provide a windshield wiper blade that includes a venturi so to create a suction or vacuum force that will cause a uniform contact throughout the blade length on the windshield.

Another object is to provide a venturi windshield wiper blade that prevents smearing of the wiped windshield surface, because the blade does not float away from the windshield surface at high speed.

Yet another object is to provide a venturi windshield wiper in which beveled edges provide a better cleaning.

Other objects are to provide a venturi windshield wiper blade which is simple in design, inexpensive to manufacture, rugged in construction, easy to use, and efficient in operation.

These and other objects will be readily evident upon a study of the following specification and the accompanying drawing, wherein:

FIG. 1 is a side view of the rubber blade alone.

FIG. 2 is a cross-sectional view thereof.

FIG. 3 is a side view of the blade fitted with top and bottom inserts.

FIG. 4 is a side edge view of the top insert.

FIG. 5 is an end view of the top insert as viewed on line 5—5 of FIG. 4.

FIG. 6 is a side edge view of the bottom insert.

FIG. 7 is an end view of the bottom insert as viewed on line 7—7 of FIG. 6.

FIG. 8 is a side view of the assembled blade.

FIG. 9 is a top view of the assembled blade and top insert.

FIG. 10 is a bottom view of the assembled blade and bottom insert.

FIG. 11 is a side view of a blade with air outlets joined to the blade sides.

FIG. 12 is a top view thereof.

FIG. 13 is a view in direction 13—13 of FIG. 11.

FIG. 14 is a side view of one of the air outlets used in the structure shown in FIG. 11.

FIG. 15 is a top view thereof.

FIG. 16 is a bottom view thereof.

FIG. 17 is a side cross-sectional view of a bottom part of a blade, and showing an attachable cap for the nipple.

Referring now to the drawing in detail, the reference numeral 10 represents a venturi windshield wiper blade according to the present invention wherein the device consists of two wedge-shaped rubber blade members so joined as to provide a roughly triangular hollow space 11 between the blade members. The bearing surface 12 is beveled at 6° (±2°) into a direction as is best shown in FIG. 2 of the drawing.

The lower end of the blade opening 11 is closed by a bottom insert 13 that slants toward the top of the blade. This insert also contains a nipple 14 for connection to a flexible hose that communicates with a washer fluid source. The nipple has an opening 15 through it.

The top end of the blade opening is closed by a top insert 16 that slants toward the bottom of the blade, and the top blade has a rectangular opening 17.

Near the top end of the blade, rectangular air outlets 18 are joined to the outer side of each blade member, each air outlet projecting slightly beyond the blade upper end. Each air outlet is upwardly tapered.

In operative use, as shown in FIG. 13, air flows through the blade and air inlets in a direction as indicated by the arrows 19.

In the event that the vehicle does not have means of attaching a flexible hose, or in the event that an ordinary wiper is desired, a cap 20 is fitted on the nipple 14. This cap must be used if a flexible hose is not attached to the blade.

In operation, the blade incorporates a venturi effect that creates a vacuum or suction force inside the blade, which thus makes a uniform contact of the entire length of the blade on the windshield. As the blade is hollow, washer fluid can be incorporated and directly injected to the area to be cleaned without waste. Such washer fluid injection is not present on other conventional blades.

The suction or vacuum (venturi effect) is created by the movement of air on the windshield, while the vehicle is in motion, due to the following: The bottom insert is closed by attaching the flexible hose from the washer fluid tank or the nipple cap. Since the top insert contains a rectangular opening, the movement of air on the windshield creates suction. The tapered rectangular air outlets joined to the sides increase the velocity of the air at the protruding (venturi effect) ends. This combination produces the suction or vacuum in relation to the design of the blades.

While various changes may be made in the detail construction, it is understood that such changes will be within the spirit and scope of the present invention as is defined by the appended claims.

I claim:

1. In a venturi windshield wiper blade the combination of two elongated, transversely wedge-shaped rubber blade members having a hollow space and a top insert closing a top end thereof, a bottom insert including a nipple with an opening therethrough for attachment to a flexible hose from a washer fluid tank, said top insert having a rectangular opening therethrough, air outlets being joined on opposite sides of said blade, the upper ends of said air outlets protruding upwardly slightly beyond an upper end of said blade.

* * * * *